Feb. 24, 1959   T. E. McCONNELL   2,874,477
FISHING LINE METER
Filed July 13, 1956
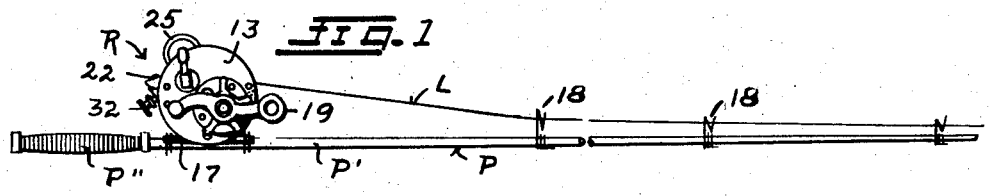
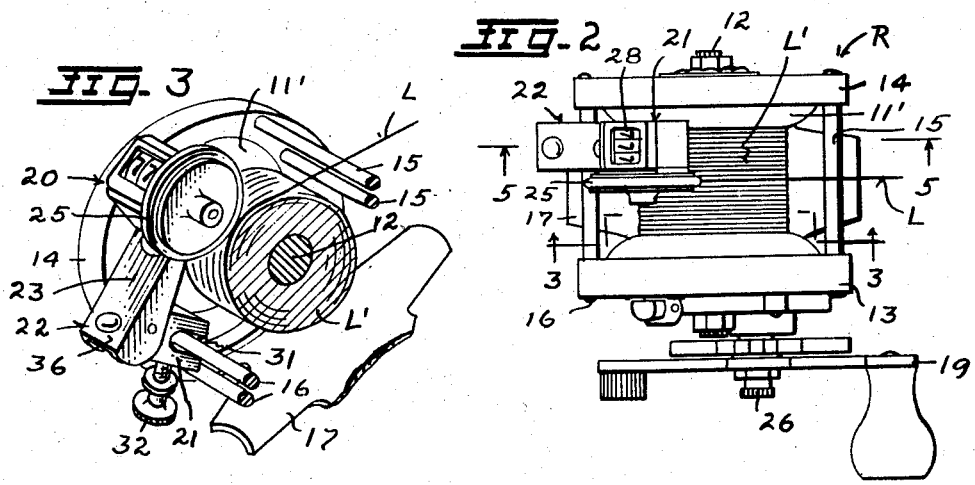
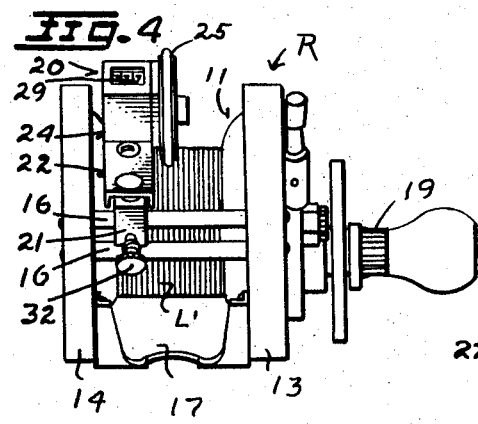
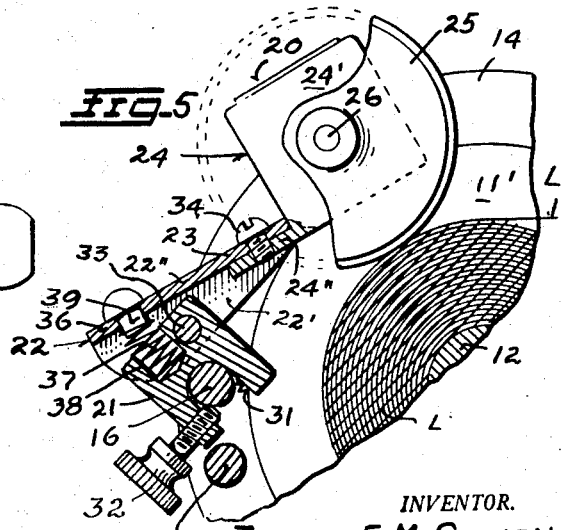
INVENTOR.
THOMAS E. McCONNELL
BY
Henry N. Young
ATTORNEY

United States Patent Office 2,874,477
Patented Feb. 24, 1959

2,874,477

FISHING LINE METER

Thomas E. McConnell, Oakland, Calif.

Application July 13, 1956, Serial No. 597,633

4 Claims. (Cl. 33—129)

The invention relates to a device which is particularly adapted for automatically and constantly indicating the length of the fishline portion which extends from a line reel.

Particularly when a fisherman cannot see the tackle at the end of a fishline extending from a line reel, he may need to know the amount of extended line, and it is a primary present object to at all times provide a relatively accurate indication of the amount of extending line by a line-metering unit which in general comprises an attachment for usual fishline reels.

Another object of the invention is to provide a constant indication of the length of extended line during and between reeling or unreeling operations with respect to it.

A further object is to provide a particularly simple and effective means for mounting the line-measuring device on a fishing reel of usual construction.

An added object is to provide an improved line-measuring device which directly utilizes the circumference of the rolled-up line portion on a reel spool to control its indications.

A general object is to provide a line-measuring device which is adaptable for its application to line-mounting spools other than those of fishline reels.

The invention possesses other objects and features of advantage, some of which, with the foregoing, will be set forth or be apparent in the following description thereof, and in the accompanying drawings, in which, Figure 1 is a fragmentary side view of a reel provided with a line-metering unit of my invention and mounted on a fragmentarily shown fishpole.

Figure 2 is an enlarged plan view of the reel and metering assembly of Figure 1.

Figure 3 is a perspective view taken at the plane of the line 3—3 in Figure 2.

Figure 4 is a rear elevation of the assembly of Figure 2.

Figure 5 is an enlarged fragmentary and partly sectional view taken from the broken line 5—5 in Figure 2.

As particularly illustrated, the line-measuring device of my invention is shown as mounted on a fishline reel R of a usual construction in which a spool 11 fixedly carried by spindle 12 is journaled in and between generally circular frame sides 13 and 14 which are fixedly spaced in parallel opposed relation by forward and rear bars 15 and 16 and a reel-mounting base-plate 17 which is arranged for its fixing to and along the shaft P′ of a fishpole P adjacent and forwardly of the grip portion P″ at the butt end of the pole. As is usual, the spool 11 has annular and oppositely dished ends 11′ which define the line-receiving space of the spool between them. The fishline L extends tangentially from its roll portion L′ on the spool 11 and laterally against a forward spacing bar 15 at the opposite side of the bar from the pole shaft P′ and through guide eyes 18 positioned at spaced points along the pole to and through a terminal eye (not shown) of the pole, all in a usual reel and line and pole relation; as shown, the spacing bars 15 and 16 are provided in pairs, but this is not essential. A usual crank handle 19 mounted on and outwardly of the frame side 13 is suitably and releasably connected with the adjacent end of the spindle 12 to provide for its manual actuation to rotate the spool to effect a reeling of the extended fishline L upon it, or a free unreeling of the line from the pool.

The present line-metering unit 20 is arranged for its mounting on a rear spacing bar 16 and essentially comprises a base block 21 rockably mounting a member 22 providing an arm 23 extending from its rocking axis and carrying a revolution counter or cyclometer 24 having an operating wheel 25 arranged for direct engagement with the line roll L′ on the spool 11 for actuation with the spool. The cyclometer-operating wheel 25 is fixed to the extending end of a control shaft 26 which is parallel to the axis of rocking of the cyclometer-carrying member 22 with respect to the base block 21, and said shaft, through appropriate gearing provided in the rectangular casing 24′ of the cyclometer, is operative to sequentially control the positions of a plurality of coaxial discs bearing number characters 29 on their peripheries for their cooperative indicating disposal at a sight opening 28 provided in the side of the casing 24′ which is furthest from the line roll L′. As shown, the base block 21 is mounted on the rear bar 16 which is furthest from the mounting fishpole, whereby to permit required rotative adjustments of the block about the bar 16 which otherwise fixedly mounts it.

The mechanism of the cyclometer 24 is, per se, a usual one, and the calibration characters 29 of its discs comprise numbers so provided in terms of the circumference of the tread of the control wheel 25 that a given number 29 of a disc will be successively displayed at the sight-opening 28 only when the wheel 25 has made a whole number, one or more, of revolutions. The arrangement is essentially such that a turning of the reel spool 11 while the line roll L′ thereon is engaged by the wheel 25 will appropriately change the mutual relation of the discs for constantly indicating the length of line which then extends from the reel. In practice, the line length from the reel to the pole tip may be ignored, or the cyclometer 24 may be set to provide a zero indication when the line extends only to the pole tip. While the present line-metering device operates in accordance with the circumference of the spool-carried fishline roll L′ at an intermediate fixed diametric plane thereof, whereby the meausrements provided may at times vary somewhat from true values, particularly if a level-winding device is not provided for the spool, any such inaccuracy may be expected to average out, and therefore will not seriously affect the use of the present cyclometer unit 20 in association with a fishline reel.

It will now be noted that the base block 21 is of generally rectangular outline and is provided with a uniform U-section groove 31 along one side thereof and having its bottom (inner) portion cylindrically curved for closely receiving the supporting spacing bar 16 in seated engagement therewith. A clamp screw 32 threadedly engaged in a part of the block 21 at a side of the channel 31, and having its operative line at the opposite side of the channel from the received bar 16, has its inner end operatively settable against the exterior of the bar for mounting the block in rotatively adjusted fixed position on the bar. The member 22 is of channel section transversely of its length and has its side flanges 22′ spaced to receive the block 21 between them, and a pivot pin 33 extended through the block and the flanges 22′ in a line parallel to the line of the channel 31 hingedly and intermediately attaches the member 22 to the block for its rocking about an axis parallel to that of the engaged bar 16. The outer end of the channel of the arm 23 complementarily receives an integral ear 24" provided by the cyclometer casing 24, and said ear is secured to the arm as by a screw 34 for fixing the cyclometer to the member 22 which thereby comprises a mounting base of and for the cyclometer.

Since the synchronized actuation of a present reversibly operative indicating cyclometer 24 with the reel spool 11 requires a constant engagement of the tread of the cyclometer-operating wheel 25 with the line roll L' on the spool, a means is provided for insuring such a condition. As particularly illustrated, an arm portion 36 of the member 22 extends oppositely from the arm 23 with respect to the axis of the pivot pin 33, and a compression spring 37 is constantly operative between the block 21 and the member 22 for yieldingly and constantly urging the engagement of the wheel 25 against the line roll L'. In the present structure, the spring 37 has one end thereof seated in a socket 38 provided in the block 21, while the other spring end is arranged to seat against the web portion 22" of the member 22 while preferably being centered by its engagement about the inwardly extending portion of a pin 39 fixed in the web 22". It will be understood that average operative pressure of the wheel 25 against the line roll L' may be adjusted as desired by effecting the rotative adjustment of the block 21 about the engaged bar 16, as provided for by a loosening and retightening of the clamp screw 32. For maintaining the best cooperative relation between the cyclometer wheel 25 and the line roll L', the distance of the axis of the shaft 26 of said wheel from the pivot pin 33 is preferably such that the wheel at all times engages the roll at a point substantially in the common plane of the spool spindle 12 and wheel-mounting shaft 26.

It will be generally understood that the described method and means for actuating an indicating cyclometer 24 against the line roll L' on a mounting fishing reel R, which may be used with or without a pole, is arranged to constantly and positively provide a fisherman with an indication of the amount of extending line in a definite and positive manner. It will be further understood, however, that the present arrangement for utilizing a reversibly operative indicating cyclometer for measuring the length of line extended from a spool on which the line may be rolled is adaptable for use in other arts, examples being the measuring of tow lines extending from reels carried by boats by which water skiers may be towed, or of sounding lines used in the water or in ground holes, or of lines carrying suspended buckets, etc.

From the foregoing description taken in connection with the accompanying drawings, the advantages of the present fishing line meter will be readily understood by those skilled in the art to which the invention appertains. While I have shown and described a structure and arrangement which I now consider to be a preferred embodiment of my invention, I desire to have it understood that the showings are primarily illustrative, and that such changes and developments may be made, when desired, as fall within the scope of the following claims:

1. In combination with a fishline reel having a frame mounting a spool carrying the fishing line for reeling and unreeling with respect to the spool and provided with a means for mounting the frame on a carrying element, a reversibly-operative indicating cyclometer provided with an actuating wheel, and a spring-loaded arm mounting said cyclometer directly on said reel frame independently of the mounting means for the frame and constantly operative to dispose said actuating wheel thereof in resilient bearing engagement with the roll of the line portion on the spool whereby a rotation of the spool is operative to actuate the cyclometer to constantly provide indications in accordance with the length of line then extending from the spool.

2. In combination with a reel having a frame comprising opposed end members connected by a spacing means including a spacing bar and mounting a spool for carrying a line for reeling and unreeling with respect to the spool, a reversibly-operative indicating cyclometer provided with an actuating wheel, and means unitarily mounting said cyclometer directly on said frame bar in rotatively adjustable relation thereto to dispose said actuating wheel thereof in constant frictional engagement with the roll of the line portion on the spool whereby a rotation of the spool is operative to actuate the cyclometer to provide indications in accordance with the length of the unreeled line.

3. In combination with a reel having a frame mounting a spool for carrying a line for reeling and unreeling with respect to a roll of the line on the spool, a non-rotative bar member of the frame spaced laterally of the axis of rotation of the spool in parallel relation thereto, a base member mounted on said bar in fixed rotatively adjustable relation thereabout, a reversibly-operative indicating cyclometer having an actuating wheel, an arm rockably mounted on said base member and fixedly carrying said cyclometer for the rolling disposal of its said wheel directly against the roll of the line portion on the spool whereby a rotation of the spool is operative to actuate the cyclometer to provide indications in accordance with the length of the unreeled line, and a spring means constantly cooperative between the arm and the base for maintaining a resiliently yielding engagement of the wheel with said roll of the line of the spool.

4. In combination with a reel having a frame mounting a spool for carrying a line for reeling and unreeling with respect to a roll of the line on the spool, a non-rotative bar member of the frame disposed laterally of the axis of rotation of the spool in fixed parallel relation thereto, a base member, means fixedly mounting the base member on said bar for its rotative adjustment about the bar axis, a reversibly-operative indicating cyclometer having an actuating wheel, an arm rockably mounted on said base member and fixedly carrying said cyclometer for the constant rolling disposal of its said wheel directly against the roll of the line portion on the spool, and a spring means constantly cooperative between the arm and the base member for maintaining a resiliently yielding engagement of the wheel with said roll of the line on the spool.

References Cited in the file of this patent

UNITED STATES PATENTS

| 2,637,112 | La Fontaine et al. | May 5, 1953 |
| 2,752,686 | Anderson et al. | July 3, 1956 |
| 2,762,129 | Morgan | Sept. 11, 1956 |

FOREIGN PATENTS

| 107,618 | Sweden | Apr. 15, 1943 |